July 16, 1935.  F. G. FOLBERTH ET AL  2,008,442
CONTROL MECHANISM FOR FLUID PRESSURE CYLINDERS
Filed Aug. 20, 1931  2 Sheets-Sheet 1
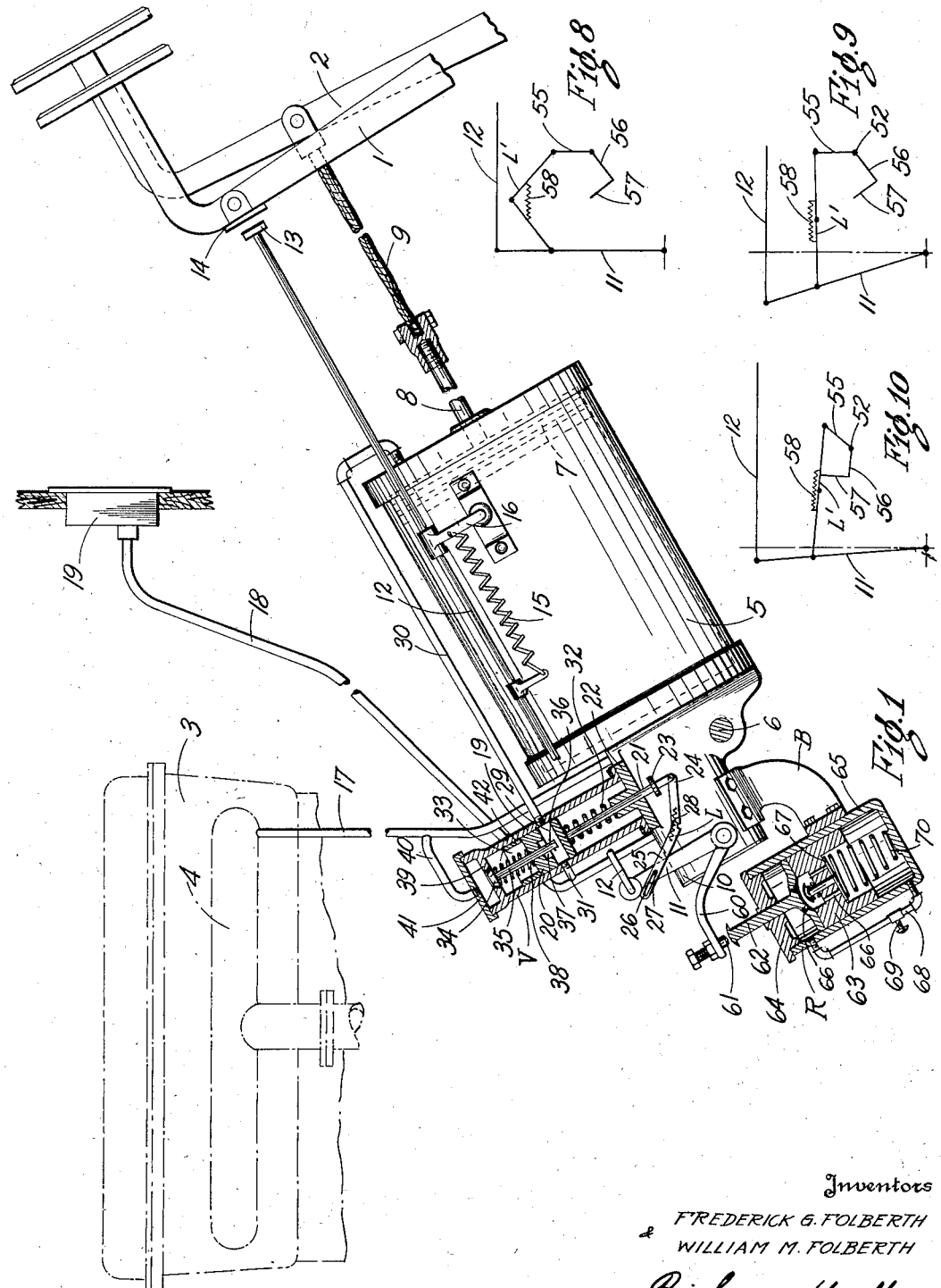
Inventors
FREDERICK G. FOLBERTH
& WILLIAM M. FOLBERTH
By Richey & Watts
Attorneys July 16, 1935.  F. G. FOLBERTH ET AL  2,008,442
CONTROL MECHANISM FOR FLUID PRESSURE CYLINDERS
Filed Aug. 20, 1931   2 Sheets-Sheet 2
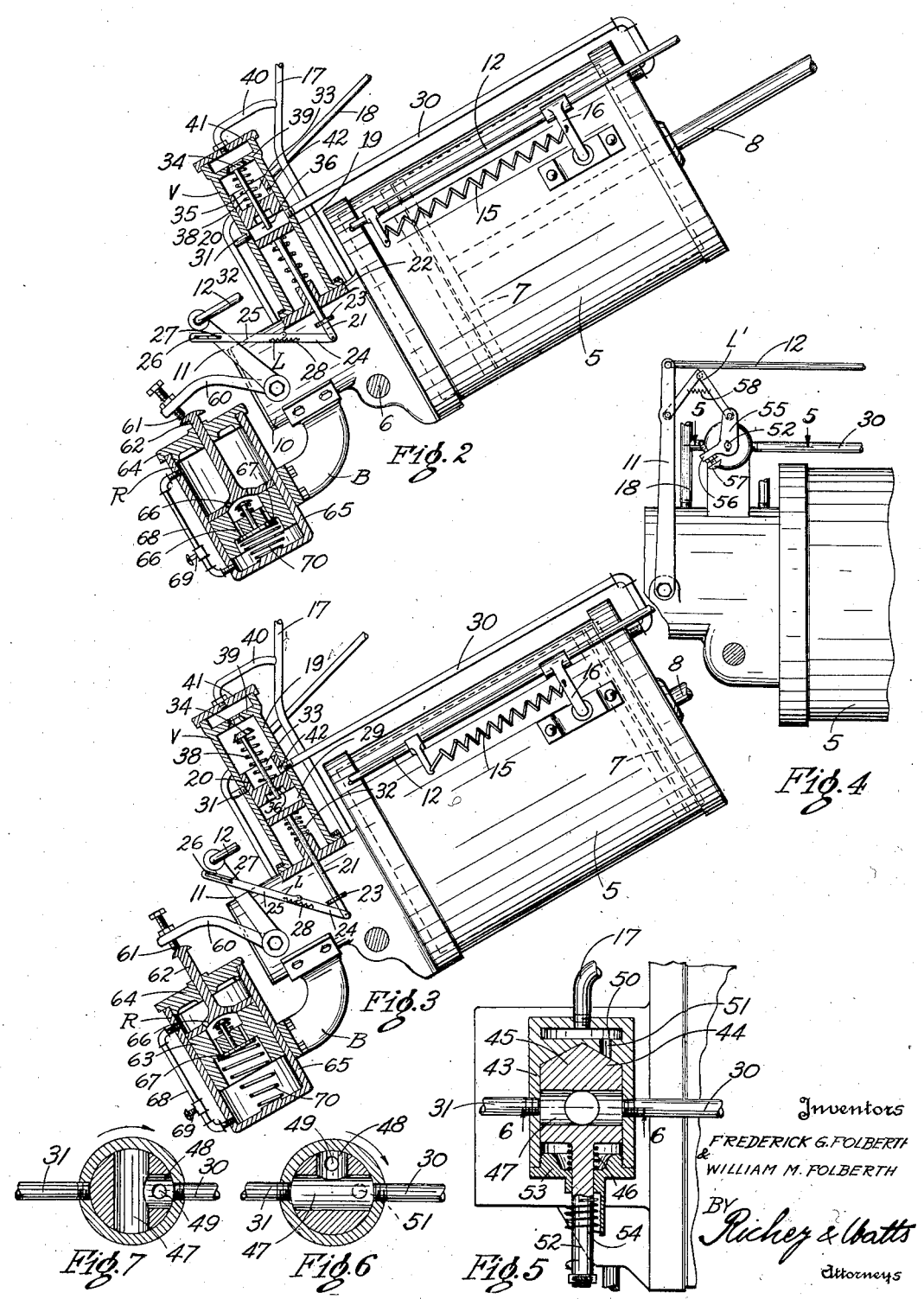

Patented July 16, 1935

2,008,442

UNITED STATES PATENT OFFICE 2,008,442

CONTROL MECHANISM FOR FLUID PRESSURE CYLINDERS

Frederick G. Folberth and William M. Folberth, Cleveland, Ohio

Application August 20, 1931, Serial No. 558,304

6 Claims. (Cl. 188—152)

This invention relates to fluid pressure actuated devices, and more particularly to brake-operating apparatus for automotive vehicles.

In our co-pending United States patent application Serial No. 483,328 filed September 20, 1930, we have described and claimed an improved brake-operating hook-up in which the reduced pressure in the intake manifold of the internal combustion engine of an automotive vehicle is employed to actuate the vehicle brakes. In the above noted application there is illustrated a cylinder, a piston within the cylinder and connected to apply the vehicle brake, and a valve for controlling the flow of air to and from the cylinder whereby the piston is caused to move therein to apply the brakes. In this apparatus, as well as in other apparatus of this class with which we are familiar, the suction of the intake manifold is employed to move the piston in a direction to apply the brakes, and a spring is employed to move the piston in the opposite direction.

Among the objects of our present invention is the provision of means for moving the piston in a brake-releasing direction in which the intake manifold suction is employed.

Other objects of our invention are: The provision of a valve arranged to momentarily connect the intake manifold of the vehicle engine to the brake actuating cylinder to cause the piston to move in a brake disengaging direction as the brakes are released; the provision of pressure operated brake actuating apparatus having a main valve and an auxiliary valve, the main valve being adapted to be manually operated to control the flow of air to and from the cylinder on one side of the piston and the auxiliary valve being adapted to control the flow of air to and from the opposite side of the piston; the provision of brake-actuating apparatus having interconnected main and auxiliary valves whereby the closing of one of the valves causes the other valve to momentarily open; the provision of a clutch pedal controlled braking system for automotive vehicles in which the operator has a positive indication when the clutch disengaging movement of the clutch pedal ceases and the braking action begins; the provision, in a vehicle control system in which the clutch pedal operates means for applying the vehicle brakes, of means for creating a different "feel" to the brake-applying movement of the clutch pedal than that of the clutch-operating movement of the pedal.

The above and other objects of the invention will appear from the following description of a preferred and a modified form thereof, reference being had to the accompanying drawings, in which:

Fig. 1 is a side elevation, partly in section, illustrating our improved fluid pressure actuated mechanism and diagrammatically showing the vehicle clutch and brake-operating pedals and engine. This view shows the parts in the positions they assume when the vehicle brakes are released and the intake manifold suction is shut off from the cylinder.

Fig. 2 is a view similar to Fig. 1, but illustrating only the cylinder and its connected parts. In this view the main valve has been opened to cause the intake manifold suction to move the piston within the cylinder to apply the vehicle brakes.

Fig. 3 is a view similar to Fig. 2, but illustrating the parts in the position which they assume during the brake-releasing operation.

Fig. 4 is a fragmentary view, illustrating a modified form of auxiliary control valve.

Fig. 5 is an enlarged horizontal section taken on line 5—5 of Fig. 4.

Fig. 6 is a section taken on line 6—6 of Fig. 5.

Fig. 7 is a sectional view similar to Fig. 6, but illustrating the valve in position to connect the intake manifold suction to the cylinder to move the piston in a brake-releasing direction.

Figs. 8, 9 and 10 are diagrammatic views of the apparatus of Figs. 4, 5 and 6, illustrating the positions of the valve operating levers and connecting link in various stages of the operation of the device.

Referring now particularly to Figs. 1, 2 and 3, the standard vehicle clutch pedal is indicated at 1 and the standard brake-operating pedal or lever at 2. An internal combustion engine is indicated at 3, having an intake manifold 4. The cylinder 5 may be suitably mounted on the vehicle frame as by a bolt 6 and carries a piston 7, having a piston rod 8 extending through the upper end of the cylinder 5. This piston rod 8 may be connected in any suitable manner to operate the vehicle brakes. In the drawings we have shown a flexible cable 9 connecting the end of the piston rod 8 to the brake pedal 2. This flexible connection permits the manual operation of the brake-pedal in the usual manner without interference by our improved fluid-pressure-brake-operating mechanism.

The application of the intake manifold suction to the lower end of the cylinder 5 is controlled by a valve which is enclosed in the housing generally indicated at 10. This valve is not shown in detail as it may be of any suitable type and its details per se do not form part of the present invention. Preferably this main control valve should be of the well known equalizing type of fluid pressure brake control valves in which the degree of application of the brakes of the vehicle is dependent upon the degree of movement imparted to the valve operating mechanism. Valves of the preferred type are adapted to give a smooth and even brake application and to permit a braking force to be applied in small increments and to maintain the brakes at any desired degree of application. A valve of the type referred to is fully shown and described in United States Patent No. 1,727,367 which issued on September 10, 1929 to J. M. J. Dormoy. For purposes of the present application, it will suffice to say that this main control valve 10 contained within the housing is controlled by a lever 11. A rod 12 is secured to the lever 11 and extends to a point adjacent the clutch pedal 1. The upper end of the rod 12 preferably carries a disk 13 and the clutch pedal 1 has an engaging member 14 adapted to strike the disk 13 and move the rod 12 to open the main control valve within the housing 10. A spring 15 is secured at one end to a stationary bracket 16 and at its opposite end to the rod 12. This spring 15 tends to move the rod 12 and the lever 11 in a direction to close the main valve.

The operation of the portion of our apparatus described above, is fully explained in the co-pending applications above noted. Briefly, the clutch pedal 1 and the rod 12 are so adjusted that when the operator pushes down on the pedal 1 the clutch is first disengaged. After the clutch is fully disengaged the member 14 strikes the end 13 of the rod 12, and further downward movement of the clutch pedal moves the lever 11 to open the main control valve. Opening of this valve 10 connects the intake manifold suction to the lower end of the cylinder 5 through the pipe 17 and the reduction of pressure within the cylinder 5 causes the piston to move downwardly therein. This downward movement of the piston is transmitted to the brake pedal through the piston rod 8 and cable 9 and applies the vehicle brakes (not shown). When the clutch pedal is allowed to move upwardly by relieving the pressure thereon, the spring 15 will return the main control valve to its off position in which the connection to the intake manifold is closed and the lower end of the cylinder 5 is connected to the atmosphere through the pipe 18 and the air filter F.

To positively retract the piston 7 after it has been moved downwardly to apply the brakes, we have provided an auxiliary valve generally indicated by V. This valve includes a cylindrical housing 19 mounted on the main valve housing 10. A piston valve member 20 is adapted to move within said cylindrical housing 19. The piston valve 20 carries a downwardly extending piston rod 21 which extends out through the supporting flange 22. A small disk-shaped stop 23 is mounted adjacent the lower end of the piston rod 21, for purposes to be explained later. The lower part 24 of a hinged connecting link L is pivoted to the lower end of the piston rod 21. The upper part 25 of the hinged link L has a slot 26 which engages a pin 27 on the main valve lever 11. A tension spring 28 extends across the hinged joint of link L.

The piston valve member 20 has a port 29 passing laterally through its lower portion. This port 29, when the parts are in the position shown in Fig. 1, connects the upper end of the cylinder 5 to the atmosphere through the pipes or conduits 30, 31 and 18. The valve member 20 is normally held in this position by the spring 32 which surrounds the valve stem 21.

The piston valve member 20 has its upper end counter-bored, as indicated at 33, and carries an auxiliary disk valve 34. This valve has a stem 35 which extends downwardly into the port 29. The lower end of the stem 35 carries a small pin 36 and the valve member 20 may be recessed as at 37 to accommodate this pin. A compression spring 38 normally causes the valve 34 to be seated against the upper end 39 of the housing 19. A by-pass pipe 40 extends from the pipe 17 to the top cover plate 41 of the housing 19 and provides a connection between the intake manifold suction and the auxiliary valve V.

In explaining the operation of our auxiliary valve V, reference will be had to Figs. 1, 2 and 3, which illustrate successive steps in the operation of our apparatus. Referring now to Fig. 1, it will be seen that the clutch pedal 1 has not yet engaged the end 13 of the rod 12, and the parts are all in what may be considered their off positions. When in these positions, the upper end of the cylinder 5 is connected to the atmosphere through the pipe 30, the port 29, the pipe 31, the pipe 18 and the air filter F. At the same time the lower end of the cylinder 5 is connected to the atmosphere through the pipe 18 and filter F. The valve 34 is seated against the seat 39 and thus the intake manifold suction is completely closed off from the upper end of the cylinder 5. The hinge of the hinged link L is broken and the pin 27 on the main valve lever 11 is against the lower end of the slot 26 in the upper part 25 of the connecting link L. A spring 28, when the parts are in these positions, tends to maintain the parts 24 and 25 in angular relation.

Referring now to Figure 2, it will be seen that the lever 11 has been moved downwardly. This movement has connected the intake manifold suction to the lower end of cylinder 5, and this suction has moved the piston 7 to apply the vehicle brakes. The parts of our auxiliary valve mechanism, however, occupy the same position as they occupied in Fig. 1, with the exception that the parts 24 and 25 of the link L have been straightened out by the movement of the lever 11 and action of spring 28. The spring 28 is so arranged that when the parts 24 and 25 are in this position (Fig. 2) it will tend to hold them in a straight line. It should be noted that the pin 27 is still against the lower end of the slot 26.

When the operator relieves the pressure on the clutch pedal 1, the spring 15 moves the rod 12 and the lever 11 to the right (Fig. 3). During this movement the pin 27 pushes against the lower end of the slot 26. This force is transmitted by the hinged link L to the lower end of the rod 21. As the parts 24 and 25 are maintained in a straight line by the spring 28, the hinge of the hinged link 11 will not break, but rather the piston rod 21 and the piston valve member 20 will be moved downwardly. During the first part of this downward movement of the piston 20 the valve 34 will remain seated, due to the action of the spring 38. However, after the valve 20 has moved downwardly a distance great enough to move the port 29 out of alignment with the pipes 30 and 31, the small pin 36 will be engaged by the member 20 and the valve 34 will be drawn away from its seat 39. A port 42 extends through the wall of the piston member 20 at the lower part of the counter-bore 33. When the piston valve 20 is moved downwardly to the position shown in Figure 3, this port 42 is lined up with the pipe 30 and a connection from the intake manifold to the upper end of the cylinder 5 is completed through the pipe 30, the port 42, the counter-bore 33, the interior of the housing 19, the pipe 40, and the pipe 17.

It will be noted that in Fig. 3 the main valve lever 11 has not yet reached its final off position, as shown in Fig. 1, and that the edge of the disk 23 is engaging the lower part of the link L. Further movement of the lever 11 from the position shown in Fig. 3 to that shown in Fig. 1 will cause the disk 23 to push against the part 24, breaking the hinge of the link L. When this occurs, the spring 32, which has been compressed by the downward movement of the piston valve member, pushes this valve member back up to its off position and the parts are again as shown in Fig. 1. It will be noted that the spring 28 tends to hold the members of the link L in a straight line. However the spring 32 is made of sufficient strength to overcome the spring 28 and bend the link L at its hinged joint after the joint has been initially broken by the disc 23.

Thus, when the operator of the vehicle removes his foot from the clutch pedal, permitting the main valve lever 11 to be moved to its off position by the spring 15, the auxiliary valve V will be moved down to momentarily connect the upper end of the cylinder 5 to the intake suction. This connection is completed for only a short time, as will be seen from the above explanation. However, it is sufficiently long to draw the piston 7 to the upper end of the cylinder 5, and the parts are then in position for again applying the brakes.

By providing this auxiliary valve mechanism, the piston is positively moved into position for another application of the brakes immediately upon release of the brakes. With this construction it is unnecessary to provide a spring to retract the piston, and, consequently, a greater braking force is available as it is unnecessary to overcome such a piston retracting spring. Moreover, the difficulty of providing a spring which will hold up under strenuous operating conditions is eliminated.

In Figs. 4, 5, 6 and 7 we have illustrated a modified form of auxiliary valve which is designed to accomplish substantially the same results as the apparatus shown in Figs. 1, 2 and 3. The modified form of valve is of the rotary type rather than piston type, and the connections between the auxiliary valve and the lever 11 are also somewhat modified.

As seen in Figs. 4 and 5, the auxiliary valve housing 43 is connected to the intake manifold suction, the atmosphere, and the upper end of the cylinder 5 by pipes 17, 31 and 30 respectively, which correspond exactly to the similarly numbered pipes in Figs. 1, 2 and 3. The rotary valve member 44 has a tapered end 45 and is maintained on its seat within the housing 43 by a spring 46. The valve member 44 is provided with a transversely extending port 47 and a normally upwardly extending port 48. The port 49 extends from the port 48 to the inner end of the valve member 44 and is parallel to the axis of the valve. The pipe 17 from the intake manifold of the vehicle engine enters a chamber 50, from which extends a passage 51, which interconnects with the bore of the housing 43 at a point radially removed from the longitudinal center line thereof.

An examination of Figs. 5, 6 and 7 will show that when the valve is in the position shown in Figs. 5 and 6, a direct connection will be established between pipes 30 and 31, and thus the upper end of the cylinder 5 will be connected to the atmosphere. When the valve 44 is rotated through 90 degrees in the direction of the arrows, the port 49 will be swung into position to align with the passage 51. At the same time the port 48 aligns with the pipe 30, and the pipe 31 is completely shut off. When in this position a direct connection is established between the intake manifold and the upper end of the cylinder 5.

Referring back to Figs. 4 and 5, the shaft 52 extends outwardly from the valve member 44 through the end cap 53 of the housing 43. The spring 54 encircles the shaft 52 and has one end secured to the shaft and the other end secured to the end cap 53. This spring is so arranged that it tends always to maintain the valve member 44 in the position shown in Figs. 4, 5 and 6, in which the upper end of the cylinder 5 is connected to the atmosphere.

An auxiliary valve operating lever 55 is secured to the outer end of the shaft 52. This lever has a lug 56 extending out from its hub portion. A set-screw 57 extends through the lug 56 and may be provided with suitable locknuts to hold it in position. A hinged link L' connects the end of the lever 55 to the main valve operating lever 11, and a spring 58 extends across the hinge of the link L' in a manner similar to the spring 28 illustrated in Figs. 1, 2 and 3.

When the parts are in the positions shown in Figs. 4 and 8, the hinged link L' is bent and the valve is in the position shown in Figs. 5 and 6. This establishes a connection between the upper end of the cylinder 5 and the atmosphere. When the clutch pedal is depressed to disengage the clutch and then further depressed to actuate the main valve lever 11, this lever 11 assumes the position shown diagrammatically in Fig. 9, and the hinged link L' is straightened out. During the straightening of the link L' the lever 55 and valve 44 do not move. If it is desired to move the lever 11 further down than is shown in Fig. 9, it may be done without affecting the connections to the cylinder 5. This is true because the ports 47 and 48 are larger than the pipes 30 and 31, and, therefore, the valve member 44 may move to a certain extent in a direction opposite to that indicated by the arrow in Fig. 6 without destroying the connection between the cylinder and the atmosphere and without establishing a connection between the cylinder and the intake manifold. When the operator removes his foot from the clutch pedal the spring 15 retracts the lever 11. This return movement of the lever 11 pushes the lever 55 to the right (Fig. 10) and moves the valve 44 to establish connection between the upper end of the cylinder 5 and the intake manifold through the pipe 30, the port 48, the passages 49 and 51, the chamber 50 and the pipe 17. The parts are now in the position shown in Figs. 7 and 10, and it should be noted that the lever 11 has not quite resumed its position as shown in Fig. 8. It will also be noted that the adjustable screw 57 is contacting with the link L'. A slight further movement of the lever 11 will cause the hinge joint of the lever L' to be broken. The spring 58 will then be thrown to a point below the center of the hinge and the spring 54 will return the valve member 44 to the position shown in Figs. 5 and 6. At the same time the hinged link L' will again assume the position shown in Figs. 4 and 8.

From the above description it will be seen that the auxiliary valve arrangement illustrated in Figs. 4, 5, 6, 7, 8, 9 and 10 will accomplish substantially the same result as that illustrated in Figs. 1, 2 and 3.

In order to give a different resistance or "feel" to the movement of the clutch pedal for its brake operating movement from the clutch disengaging movement, we have provided the fluid pressure resistance unit or dash pot, which is generally indicated at R. The unit R is supported by a bracket B which is secured to the valve housing 10. An arm 60 is secured to the same shaft as the main valve operating lever 11. This arm carries an adjusting screw 61 at the outer end, which is adapted to engage the upper end of a rod 62. Rod 62 carries a piston 63 at its lower end and has a bearing in the end cap 64 of the cylindrical housing 65. The piston 63 is provided with holes 66 and a check valve 67, which is adapted to prevent the flow of fluid through the holes 66 when the piston moves downwardly within the cylinder 65 but to permit a free flow through the holes during the upward travel of the piston. A by-pass pipe 68 having an adjustable valve 69 connects the lower end of the cylinder 65 to the upper end. A compression spring 70 normally maintains the piston 63 at the top of the cylinder 65.

In the operation of our apparatus, the screw 61 is adjusted so that it contacts with the upper end of the rod 62 when the lever 11 is in the position shown in Fig. 1. When lever 11 is moved through movement of the vehicle clutch pedal, it must necessarily force the piston 63 downwardly in the cylinder 65. As this cylinder is completely filled with a relatively incompressible liquid, such as oil, glycerine, or the like, it will offer a certain resistance to the lever 11. This resistance will depend upon the setting of the valve 69, which permits the fluid to flow from the bottom of the cylinder 65 to the top thereof during the downward movement of piston 63. By properly adjusting the valve 69 any desired degree of additional resistance may be imposed upon the clutch pedal to indicate to the operator when he is operating the brake controlling valve. When the operator removes his foot from the clutch pedal the lever 11 is returned to its off position, carrying with it the arm 60. The spring 70 causes the piston 63 to be immediately moved to the top of the cylinder 65. Practically no resistance to this upward movement is offered by the fluid within the cylinder, as the check valve 67 is arranged to permit free flow of fluid through the holes 66 in the piston 63 during its upward movement.

We have described in considerable detail the embodiments of our invention illustrated in the accompanying drawings. It will be understood, however, by those skilled in the art, that modifications of and variations from the apparatus herein shown and described may be made without departing from the spirit of our invention. We do not, therefore, wish to be limited to the specific forms of our invention herein shown and described, but claim all embodiments thereof coming within the scope of the appended claims.

We claim:

1. Apparatus of the class described including in combination, a cylinder, a piston in said cylinder having a piston rod extending out through one end of said cylinder, a valve adapted to control the flow of actuating fluid to and from said cylinder on one side of said piston, an auxiliary valve adapted to control a flow of actuating fluid pressure to and from said cylinder on the other side of said piston, means for operating each of said valves, and means interconnecting said operating means whereby the position of one of said valves will be momentarily changed by movement of the operating means of the other of said valves.

2. Vehicle control apparatus including, in combination, a brake operating lever, fluid pressure actuated means for operating said lever, a valve for controlling the flow of fluid under pressure to said actuating means, a valve operating lever adapted to open said valve when moved in one direction and to close said valve when moved in the opposite direction, an auxiliary valve, connections between said auxiliary valve and said valve actuating lever whereby movement of said lever in one direction only will operate said auxiliary valve.

3. An automotive vehicle including a fluid pressure actuated brake operating system comprising a source of actuating fluid pressure, a cylinder, a piston, a valve for controlling the movement of said piston in brake applying direction, a second valve for controlling the movement of said piston in brake releasing direction, means for operating said first named valve, and means responsive to movement of said first named valve for actuating said second valve, said last named means including a hinged link interposed between said means for operating said first named valve and said second named valve.

4. An automotive vehicle including a fluid pressure actuated brake operating system comprising a source of actuating fluid pressure, a cylinder, a piston, a valve for controlling the movement of said piston in brake applying direction, a second valve for controlling the movement of said piston in brake releasing direction, means for operating said first named valve, and means responsive to movement of said first named valve in closing direction for momentarily opening said second valve to move said piston in brake releasing direction.

5. In apparatus of the class described, the combination of a cylinder, a piston in said cylinder, fluid pressure conducting conduits extending from a source of supply of actuating pressure to each end of said cylinder, a valve for controlling the connection of said conduits to one end of said cylinder, a second valve for controlling the connection between said conduits and the opposite end of said cylinder, and means for interconnecting said valves whereby movement of said first named valve in a direction to shut off the connections to the source of supply of fluid pressure will actuate said second named valve to momentarily connect said opposite end of said cylinder to the source of actuating pressure, said means including a connecting link having a hinged joint and a spring extending across said hinged joint and secured at its ends to said link.

6. In apparatus of the type described, a main valve operating lever, auxiliary valve operating means, a hinged link adapted to interconnect said main valve operating lever and said auxiliary valve operating means, spring means extending across the hinge of said hinged link and secured to said link on either side of the hinge, and means associated with said auxiliary valve operating means for breaking said hinge upon movement of said main valve operating lever in valve closing direction.

FREDERICK G. FOLBERTH.
WILLIAM M. FOLBERTH.